(12) United States Patent
McNulty

(10) Patent No.: US 7,140,112 B2
(45) Date of Patent: Nov. 28, 2006

(54) HEAD COVER TRIMMING SYSTEM

(75) Inventor: Edward McNulty, Midland, VA (US)

(73) Assignee: JEG, Inc., Midland, VA (US)

(*) Notice: Subject to any disclaimer, the term of this patent is extended or adjusted under 35 U.S.C. 154(b) by 257 days.

(21) Appl. No.: 10/645,574

(22) Filed: Aug. 22, 2003

(65) Prior Publication Data
US 2005/0039583 A1   Feb. 24, 2005

(51) Int. Cl.
B26B 25/00   (2006.01)
(52) U.S. Cl. .............. 30/316; 30/276; 30/286; 30/DIG. 7; 172/13; 172/15
(58) Field of Classification Search ............ 30/276, 30/300, 301, 316, 347, DIG. 7, 286, 287, 30/294; 172/13, 15, 25, 19, 111
See application file for complete search history.

(56) References Cited

U.S. PATENT DOCUMENTS

| | | | | |
|---|---|---|---|---|
| 1,064,790 A | * | 6/1913 | Tucker | 30/316 |
| 1,857,383 A | * | 5/1932 | Johnson | 30/316 |
| 2,882,600 A | * | 4/1959 | Baker | 30/316 |
| 3,062,299 A | * | 11/1962 | Koepfinger | 172/18 |
| 3,143,176 A | * | 8/1964 | Drane, Jr. | 172/13 |
| 3,174,224 A | * | 3/1965 | Rousselet | 30/264 |
| 3,554,293 A | * | 1/1971 | Aman et al. | 172/13 |
| 3,555,680 A | * | 1/1971 | Ford | 30/276 |
| 3,565,179 A | * | 2/1971 | Paliani | 172/19 |
| 3,747,213 A | * | 7/1973 | Green et al. | 30/279.2 |
| 3,814,189 A | * | 6/1974 | Thompson | 172/13 |
| 3,905,103 A | * | 9/1975 | Ford et al. | 30/276 |
| 3,960,218 A | | 6/1976 | Atchley et al. | |
| D242,894 S | | 1/1977 | Harris | |
| 4,260,026 A | | 4/1981 | Deckert | |
| 4,357,752 A | | 11/1982 | Goodwin, Jr. | |
| 4,547,966 A | | 10/1985 | Eden | |
| 4,832,131 A | * | 5/1989 | Powell et al. | 172/25 |
| 5,461,788 A | * | 10/1995 | Taylor | 30/300 |
| 5,938,290 A | | 8/1999 | Mikeska | |
| 6,038,774 A | | 3/2000 | Boekeloo et al. | |
| 6,125,776 A | * | 10/2000 | Carmichael | 111/113 |
| 6,134,789 A | * | 10/2000 | Strickland | 30/276 |
| 6,247,539 B1 | * | 6/2001 | Jerez | 172/41 |
| 6,311,782 B1 | | 11/2001 | Plasek et al. | |
| 6,412,568 B1 | | 7/2002 | Thede | |

OTHER PUBLICATIONS

Reliable Golf Course Supplies, 2002 Catalog, TAS Trimmers, pp. 13.

(Continued)

Primary Examiner—Boyer D. Ashley
Assistant Examiner—Carolyn Blake
(74) Attorney, Agent, or Firm—Diederiks & Whitelaw PLC

(57) ABSTRACT

A head cover trimming system for trimming around a ground level head cover includes a head cap and a grass trimmer assembly. The head cap is provided on the head cover and includes a centering member. The grass trimmer assembly includes a head member having a peripheral edge portion along which is mounted a cutting element. The grass trimmer assembly is driven through a drive shaft connected to a rotary tool at one end. Arranged within the head member is a retractable centering shaft. When the head member is placed over the head cover, the centering shaft is received by the centering member to center the grass trimmer about the head cover. The centering shaft retracts into the head member to allow the rotating cutting element to trim the area around the head cover.

14 Claims, 7 Drawing Sheets

OTHER PUBLICATIONS

Kenyon Tools—Sprinkler Head Trimmers, http://www.kenyontools.com/products/irrigation/44-002.htm, Jun. 24, 2003.

Sprinkler Head Trimmer, http://www.bm5-europe.co.uk/pdf/page%2021%20sprink-aquatine,pdf, Jun. 24, 2003.

* cited by examiner

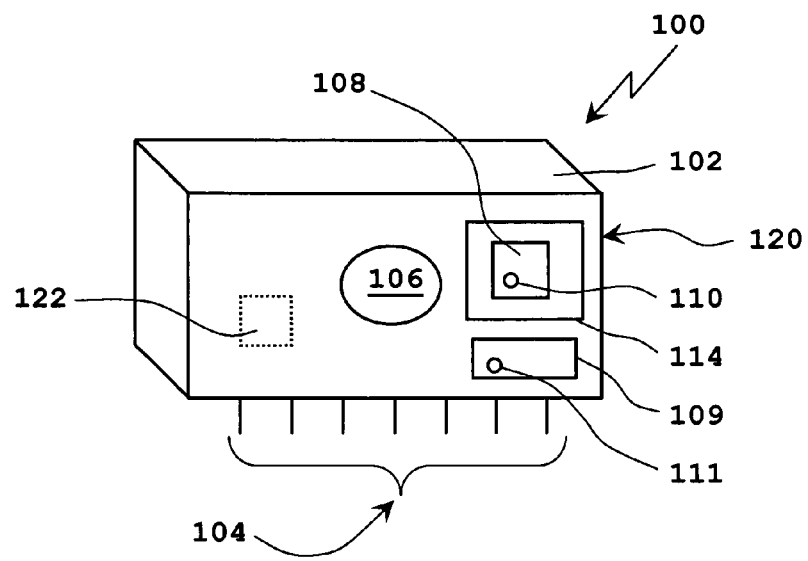
FIG. 1
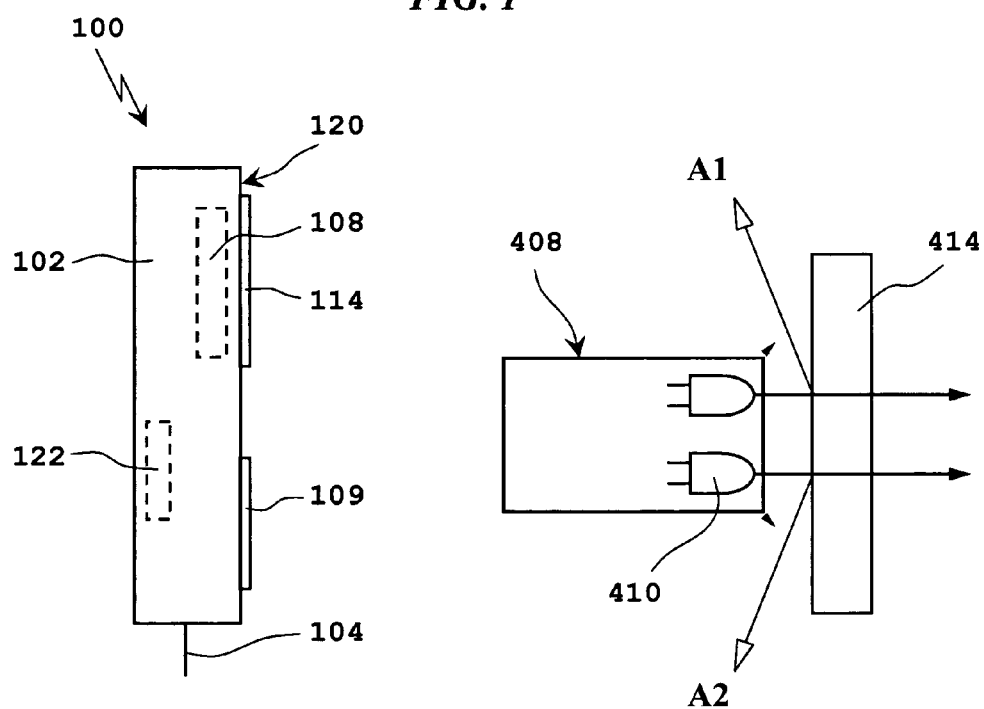
FIG. 2
FIG. 8
*(Prior Art)*

HEAD COVER TRIMMING SYSTEM

BACKGROUND OF THE INVENTION

1. Field of the Invention

The present invention pertains to the art of grass trimmers and, more particularly, to a grass trimming system for cutting grass around a substantially ground level head cover, such as a sprinkler head of an underground irrigation system.

2. Discussion of the Prior Art

Many grass covered areas, such as public parks, dog parks, ball fields and, particularly, golf courses1 are provided with underground sprinkler or irrigation systems, as well as other ground level objects such as yardage markers and drain covers. Underground sprinklers are used for a variety of reasons, such as convenience, safety and aesthetics as they do away with unsightly hoses and sprinklers that lay about the landscape.

Typically, an underground sprinkler system includes a plurality of independently controlled zones each having an associated plurality of sprinkler heads. The zones may be manually activated for a undetermined period or, more commonly, through a central controller that establishes particular on and off times, as well as a desired duration of each "on"time. In any case, the sprinkler heads are generally positioned even with, or slightly below, ground level so as to allow a lawn mower to pass over head without causing damage to the sprinkler head. When activated, the sprinkler head will "pop-up"either partially or fully above the ground to emit a stream of water that is directed over a prescribed area.

As the sprinkler heads are mounted at or below ground level, grass growing around the sprinkler head may grow too close, thereby preventing the sprinkler head from operating correctly. Moreover, as the sprinkler heads are periodically trod upon or, for that matter, driven upon by lawn equipment, dirt can build up around the head and also interfere with normal operation. Towards that end, landscape maintenance people and groundskeepers must periodically trim around the sprinkler heads. When choosing a tool to trim around the sprinkler heads, there is a wide array of choices. However, all the trimming tools fall into one of two general categories: manual and motor driven.

Manually operated trimming tools typically consist of a main shaft having a handle provided at one end, and a cutting blade at the other. The cutting blade is centered over the sprinkler head and the handle rotated to cut or trim the grass. While effective, manual trimming tools are a bit unwieldy, and are also a bit slower than their motor-driven counterparts which, like the manually operated trimming tool, typically include a shaft having a cutting head mounted at one end. However, unlike manually operated tools, the opposite end of the shaft is either connected to a powered trimmer or driven by a rotary tool, such as a battery operated drill. In operation, the cutting head is placed over the sprinkler head and the powered trimmer or rotary tool activated, thereby driving the cutting head to cut the grass. While also very effective, the powered trimmers currently available are difficult to center over the sprinkler head. Often times, the cutting head will cut an asymmetrical area around the sprinkler. If the tool is not centered correctly, the cutting head could detrimentally impact the sprinkler head itself or, for that matter, underlying water piping or even electrical wiring that could render the sprinkler head inoperable. Similar problems exist in connection with trimming around other ground level head cover structures, such as yardage markers, drain covers and the like.

Based on the above, there still exists a need in the art for an enhanced head cover trimming system for cutting grass around a sprinkler head. More specifically, there exists a need in the art for a trimming system for ground level head covers in general, including, in addition to sprinkler heads, drain covers, golf course yardage markers and the like.

SUMMARY OF THE INVENTION

The present invention is directed to a head cover trimming system, including a head cap and a grass trimmer for cutting grass around a sprinkler head or the like. When employed in connection with a sprinkler head, the sprinkler head includes a housing having a top cover portion and a cylindrical body portion, with the head cap being arranged on the top cover. More specifically, the head cap includes a main body portion having a bottom surface fixedly secured to or integrated into the top cover portion of the housing cover and a top surface including a centering member.

In accordance with a preferred embodiment of the present invention, the grass trimmer includes a head member having a substantially circular outer peripheral edge portion interconnected to a central hub through an intermediate portion. More specifically, the head member is sized to fit over a typical sprinkler head or another ground level head cover object, such as a yardage marker or drain cover. A drive shaft member interconnects the head member with a rotary tool, such as a cordless drill, that, when operated, rotates the head member cutting the grass and generally trimming the area around the head cover.

In accordance with a more preferred form of the invention, the grass trimmer includes a central centering shaft that extends centrally from within the head member and projects below the outer peripheral edge portion. When the head member is placed over the head cover, the centering shaft is received by the centering member of the head cap. Preferably, the centering member is constituted by a recessed portion sized to receive the centering shaft. With this arrangement, the head member is centered about the head cover permitting a clean cut. Moreover, with this particular arrangement, the head member cannot become off-center, thereby ensuring that the cutting element will not damage the head cover.

In accordance with the most preferred embodiment of the present invention, the centering shaft is adapted to retract into the head member. Actually, the centering shaft retracts into a centering shaft housing that is centrally positioned within the head member. In this manner, the head member can travel downward into the ground making a slightly deeper cut, thus not only trimming the grass but, also edging the area around the head cover.

Obviously, the head cover trimming system is adaptable to a wide range of applications. More specifically, the head cover trimmer can be used to trim about a broad array of circular or substantially circular ground level objects embodying a head cap in accordance with the invention. For instance, the head cap could be mounted upon, for example, sprinkler heads, drain covers, yardage markers, or valve access ports. Moreover, each of the aforementioned objects could be integrally formed with a corresponding centering member in order to receive the center shaft of the head trimmer.

Additional objects, features and advantages of the present invention will become more readily apparent from the following detailed description of a preferred embodiment

BRIEF DESCRIPTION OF THE DRAWINGS

FIG. 1 is a perspective view of an area about a hole at a golf course showing a head cover trimming system constructed in accordance with the present invention poised above a sprinkler head;

DETAILED DESCRIPTION OF THE PREFERRED EMBODIMENTS

Figure 3:
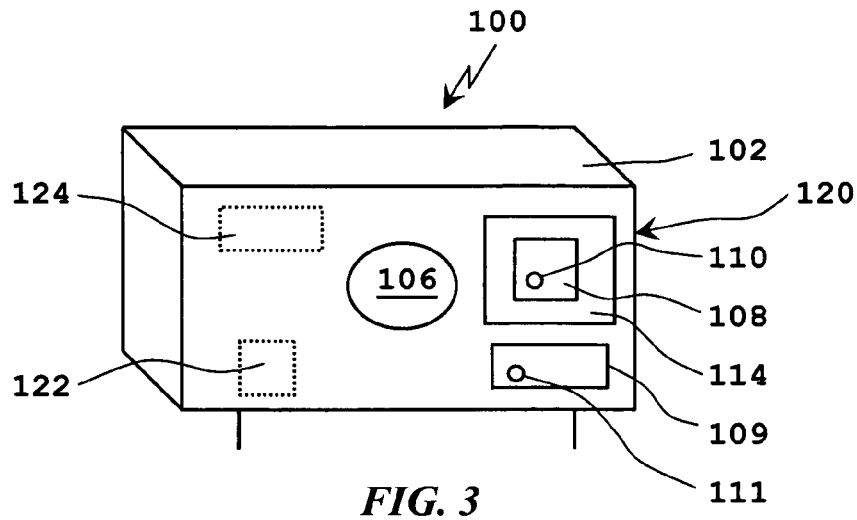
FIG. 3 is an elevational view of the head cap of FIG. 2.

With initial reference to FIG. 1, the present invention is generally shown for use at a green 1 of a golf course. To this end, FIG. 1 depicts a hole 2 having extending therefrom a pin 3 associated with green 1. About green 1 is a higher cut grassy area generally referred to as a "first cut" 4. Located in first cut 4 is a buried sprinkler head assembly 6. In the embodiment shown, sprinkler head 6 includes a main housing 10 having a top cover 12 and a cylindrical body 13. It should be initially noted that the use of sprinkler head assembly 6 in connection with green 1 only represents a single use of the invention. As will become more fully apparent from the following detailed discussion of the invention, sprinkler head assembly 6 can be employed in a wide range of environments wherever an underground sprinkler system is employed.

In a manner known in the art, sprinkler head assembly 6 will be caused to spray water in a predetermined pattern, with sprinkler head 6 either remaining stationary or rotating during operation. Actually, when water is supplied to sprinkler head assembly 6, a central portion (not separately labeled) of top cover 12 lifts or "pops-up" above the ground to spray water in the predetermined pattern. Once the water supply is stopped, top cover 12 retracts into main housing 10 so as to be at or below ground level. Over time, grass and dirt can build up around sprinkler head assembly 6 preventing top cover 12 from lifting when the water is supplied. In that case, the surrounding grass will not receive the required amount of irrigation. Towards that end, the area around the sprinkler head must be maintained, that is the grass and dirt build-up must be periodically removed to ensure proper operation of each sprinkler head assembly 6. Accordingly, groundskeepers or maintenance people periodically trim the area around each sprinkler head 6. In accordance with the present invention, a head cover trimming system indicated generally at 20 is employed for this purpose.

In accordance with a preferred embodiment of the present invention, head cover trimming system 20 includes a head cap 24 and a grass trimming assembly 30. More specifically, grass trimming assembly 30 includes a cutting head system 34 connected to a drive shaft 40. Drive shaft 40 is also connected to a rotary tool 42 which, in the embodiment shown, is depicted as a cordless drill. However, it should be understood that various other mechanisms could be used to operate grass trimming assembly 30, such as corded drills, as well as gas and electric powered trimmers. It should also be understood that, although the invention is being described in connection with the preferred embodiment of trimming about a sprinkler head, the term "head cover" is used to describe any circular or substantially circular ground level cover including a drain cover, yardage marker and the like. In any event, as will be detailed more fully below, grass trimming assembly 30 is adapted to cooperate with head cap 24 to ensure a clean cut around main housing 10 while at the same time preventing cutting head system 34 from accidentally damaging top cover 12 or other components of sprinkler head assembly 6.

Figure 2:
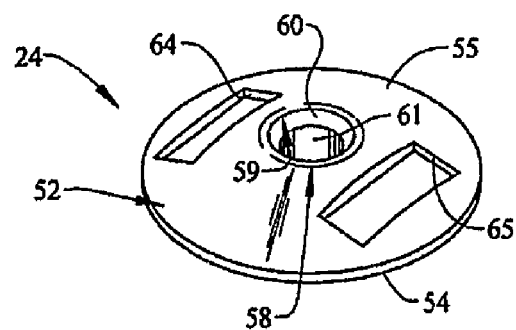
FIG. 2 is a upper perspective view of a head cap portion of the overall head cover trimming system.
Figure 3:
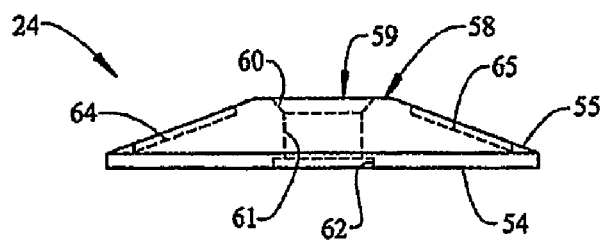
Figure 4:
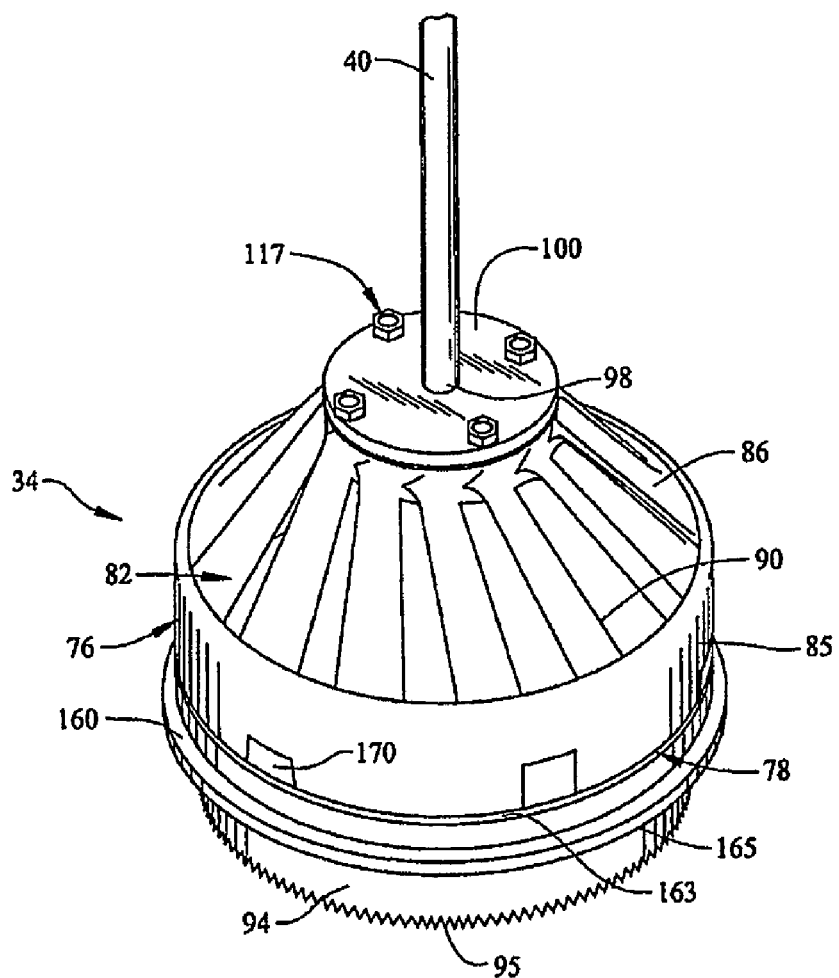
Figure 5:
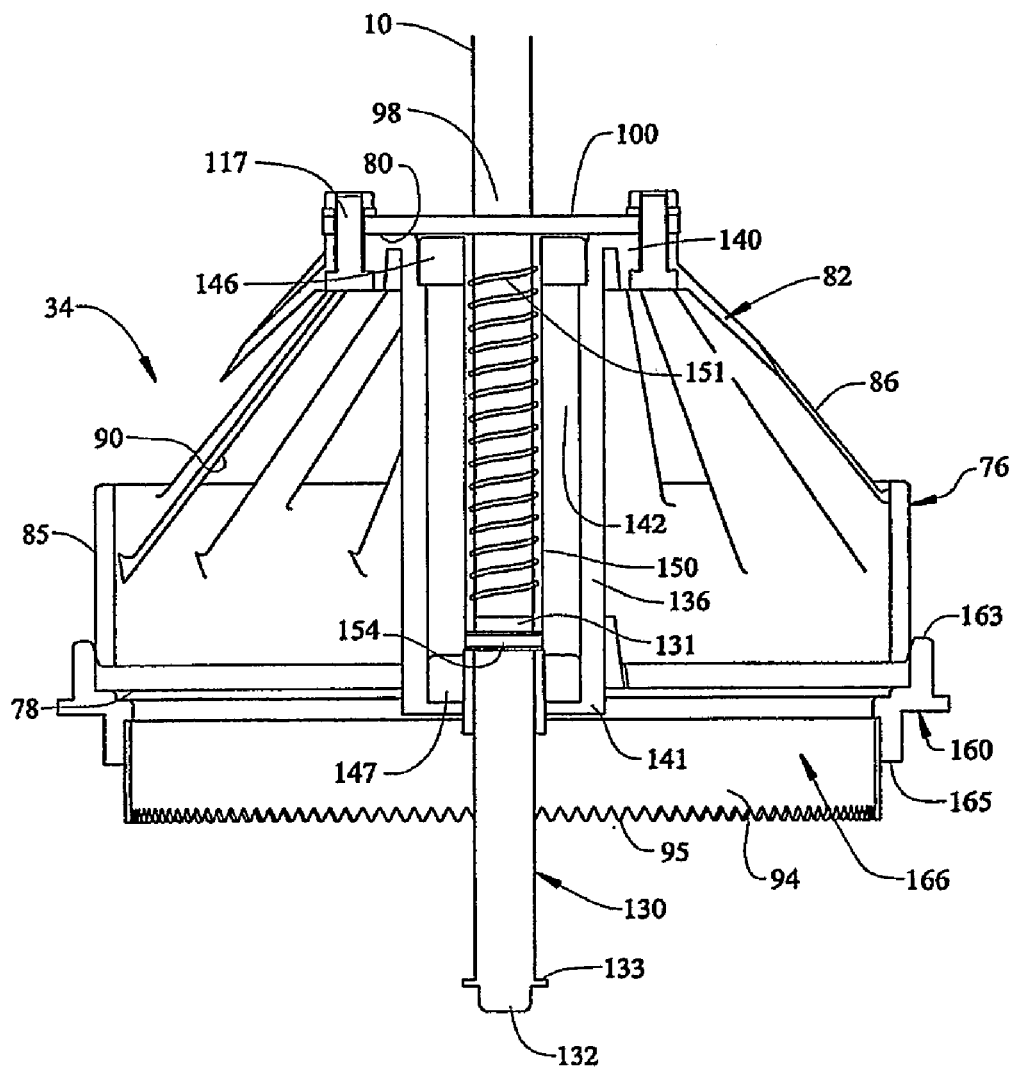
Figure 6:
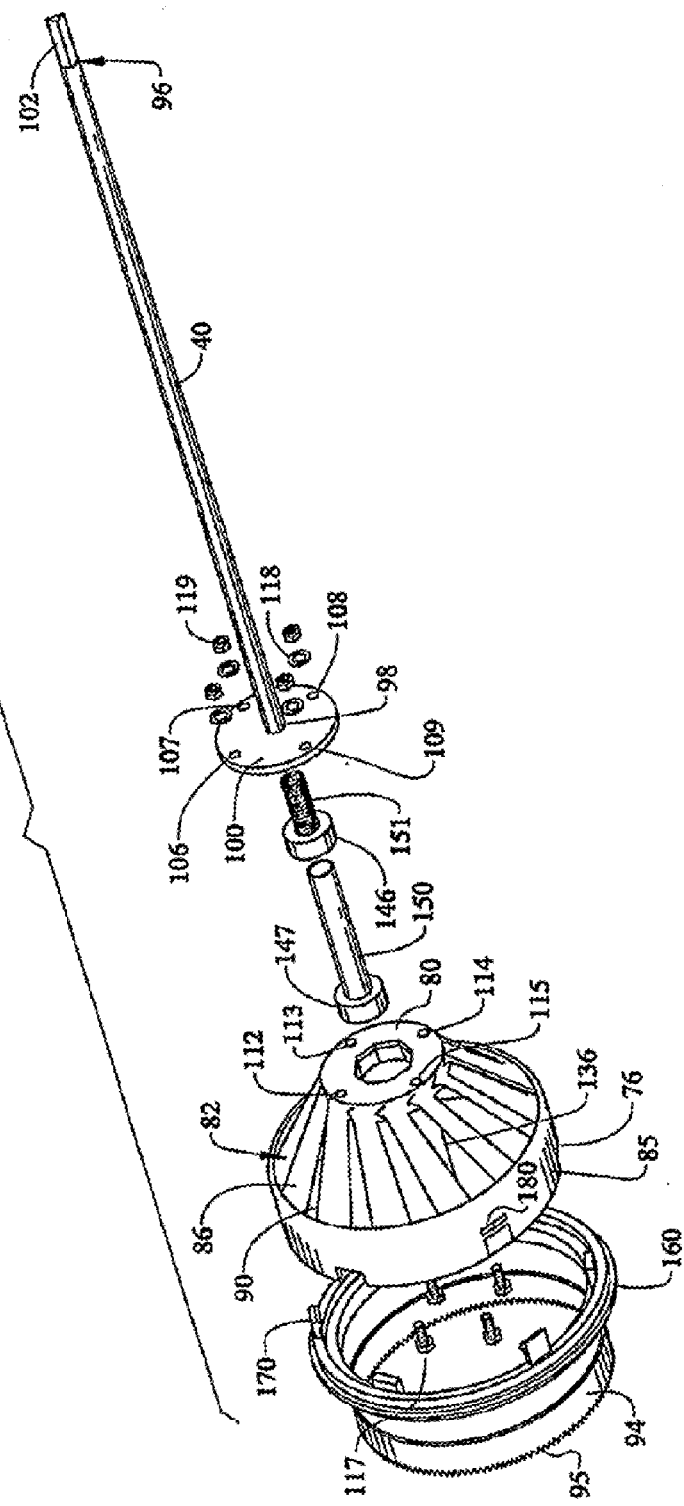
Figure 7:
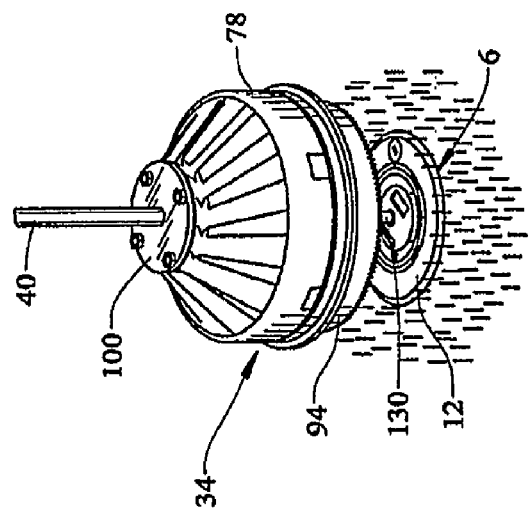

Referring to FIGS. 2 and 3 illustrating one preferred form of the present invention, head cap 24 includes a main body portion 52 having a bottom surface 54 and a top surface 55. In accordance with the invention, a centering member 58 is positioned centrally on top surface 55. In the embodiment shown, centering member 58 is constituted by a central recess 59 having an upper receiver or tapered portion 60 extending to a cylindrical bore 61 which leads to a terminal end portion 62. As will be detailed more fully below, centering member 58 is adapted to cooperate with corresponding structure on grass trimming assembly 30 so as to position cutting head system 34 about main housing 10. Top surface 55 of head cap 24 is also provided with a plurality of recessed portions 64 and 65 which enable information plates, such as a plate indicating the yardage remaining to hole 2 or other information relating to the particular zone in which the particular sprinkler head 6 to be incorporated into head cap 24.

Figure 4:
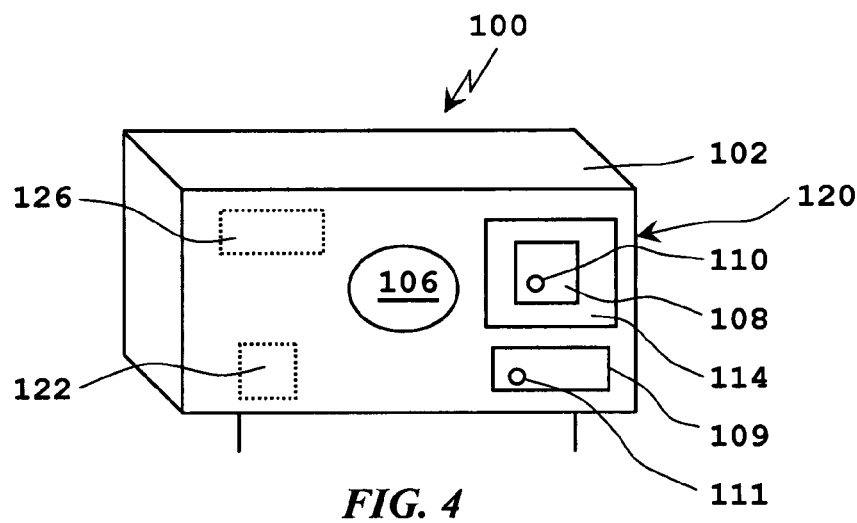
FIG. 4 is an upper perspective view of a head cover trimming assembly portion of the overall head cover trimming system of the present invention.
Figure 5:
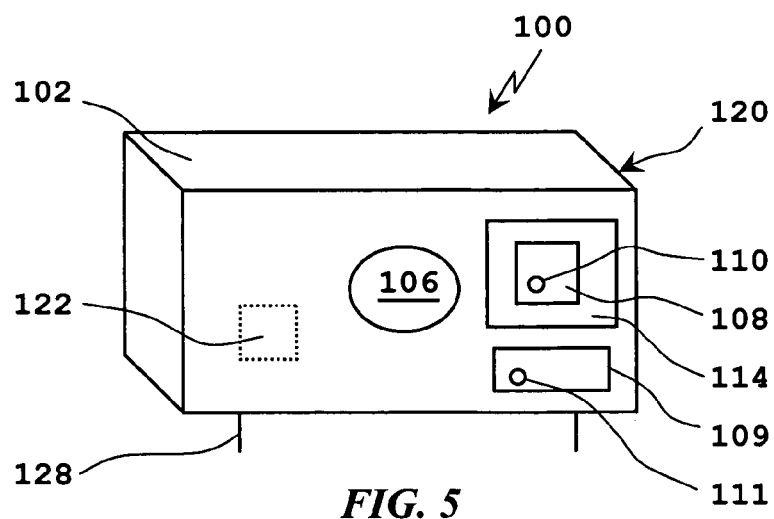
FIG. 5 is a cross-sectional elevation view of the head cover trimming assembly of FIG. 4.
Figure 6:
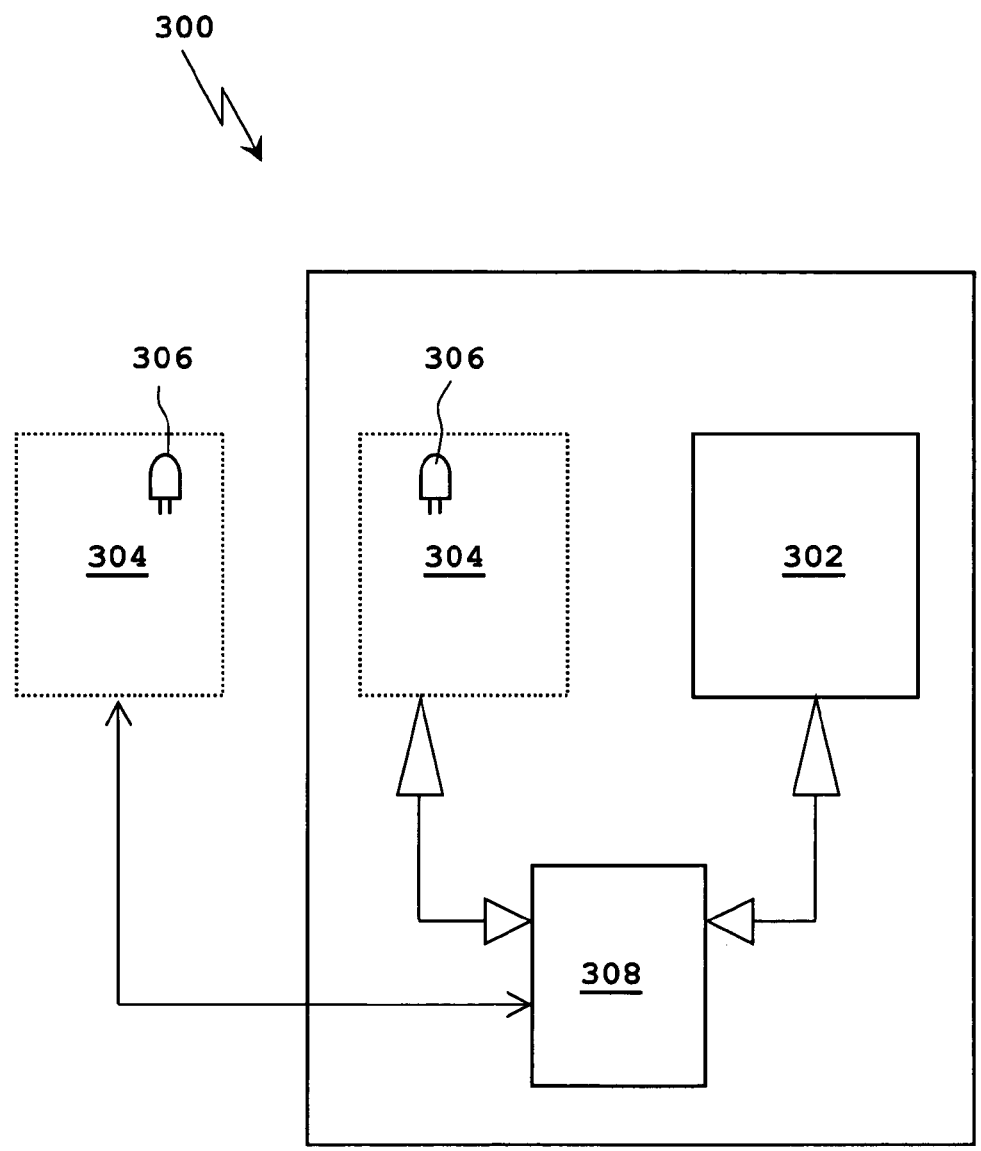
FIG. 6 is an exploded view of the head cover trimming assembly of FIG. 4.

FIGS. 4–6 illustrate a preferred embodiment of cutting head system 34. As shown, cutting head system 34 includes a head member 76 having an outer peripheral edge portion 78 leading to an upper, central hub 80. Extending between outer peripheral edge portion 78 and central hub 80 is an intermediate portion 82 which, in the embodiment shown, includes a peripheral or circular side wall section 85 that leads to a tapered section 86. As shown, tapered section 86 extends to central hub 80. As further shown, tapered section 86 includes a plurality of vented openings 90 which, as will be detailed more fully below, generates an air flow within head member 76 to draw away and expel cut grass from about sprinkler head assembly 6. In addition, positioned at or about outer peripheral edge portion 78 of head member 76 is a cutting element 94 which, in the embodiment shown, is constituted by a circular blade having a plurality of lower teeth 95 for both cutting grass and edging about sprinkler head assembly 6.

In accordance with a preferred embodiment of the present invention, head member 76 is removably secured to drive shaft 40. As shown, drive shaft 40 includes a driven end 96 that extends to a driving end 98. Driving end 98 terminates in a plate portion 100 that, as will be detailed more fully below, is secured to head member 76. In a manner known in the art, driven end 96 is provided with one or more flats 102 which limit the possibility of slippage when driven end 96 is placed into a chuck portion (not separately shown) of rotary tool 42. In any event, plate 100 is provided with a plurality of radially spaced holes 106–109 that align with a corresponding plurality of holes 112–115 arranged on central hub 80. With this arrangement, head member 76 is detachably secured to drive shaft 40 using a plurality of mechanical fasteners indicated generally at 117, in combination with lock washer 118 and nuts 119.

In accordance with the most preferred form of the present invention, cutting head system 34 is provided with a central, centering shaft 130 adapted to cooperate with centering member 58 of head cap 24. As shown, centering shaft 130 includes a first end 131 mounted centrally within head member 76 leading to a second end 132 having arranged thereon a positioning ring 133. Positioning ring 133 is actually sized to cooperate with upper tapered portion 60 of central recess 59 in order to locate centering shaft 130 with respect to head cap 24. Centering shaft 130 is actually retractably positioned within head member 76. Towards that end, a centering shaft housing 136 is centrally supported within head member 76. More specifically, centering shaft housing 136 includes a first end 140 secured with central hub 80 through mechanical fasteners 117, a second end 141 and a hollow, cylindrical, main body portion 142. As best seen in FIGS. 5 and 6, arranged within centering shaft housing 136 are a pair of upper and lower bearings 146 and 147 that provide support for a centering shaft retainer 150. As shown, first end 131 of centering shaft 130 is retractably received by centering shaft retainer 150. In addition, arranged within centering shaft retainer 150, between second end 131 of centering shaft 130 and central hub 80, is a spring 151 which outwardly or downwardly biases centering shaft 130. In addition, in order to prevent centering shaft 130 from becoming cocked in centering shaft retainer 150, a bushing 154 is fitted around first end 131. With this arrangement, centering shaft 130 can slide or easily retract into centering shaft retainer 150 without becoming misaligned and jamming.

In further accordance with the most preferred embodiment of the present invention, head member 76 is provided with a cutting element holder 160 that is detachably secured to outer peripheral edge portion 78. In the embodiment shown, cutting element holder 160 includes an upper edge portion 163 and a lower edge portion 165 which preferably define a central recess 166 adapted to receive cutting element 94. More specifically, upper edge portion 163 is provided with a plurality of tab elements, one of which is indicated at 170 in FIGS. 4 and 6, that are adapted to snap-fittingly engage into a corresponding plurality of slots 180 arranged about side wall section 85 of head member 76.

Figure 7:
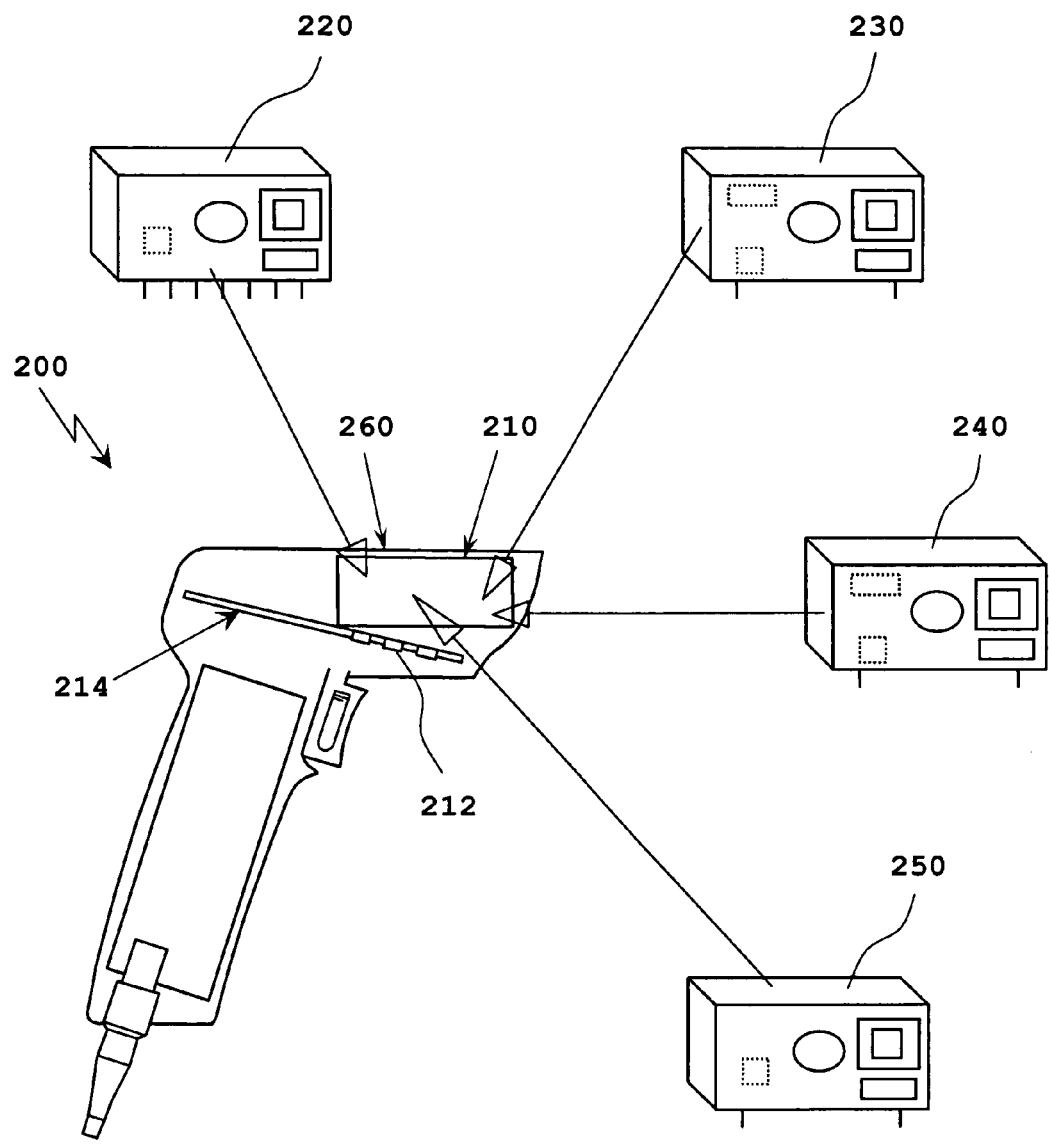
FIG. 7 is a partial perspective view of the head cover trimming assembly of FIG. 4 positioned above a sprinkler head.
Figure 9A:
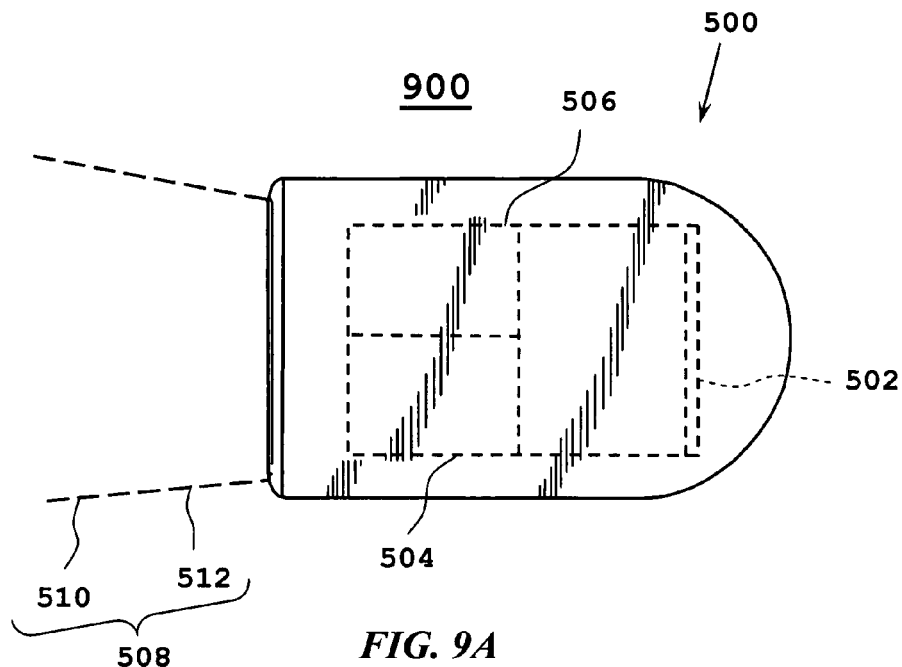
FIG. 9 is a perspective view of the head cover trimming system cutting grass and edging around the sprinkler head.
Figure 9B:
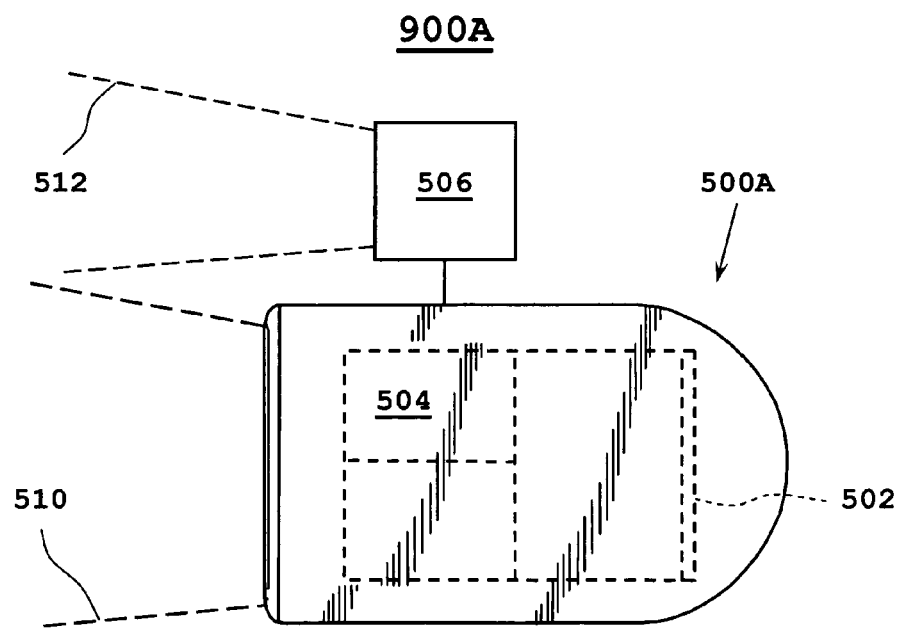
Figure 9C:
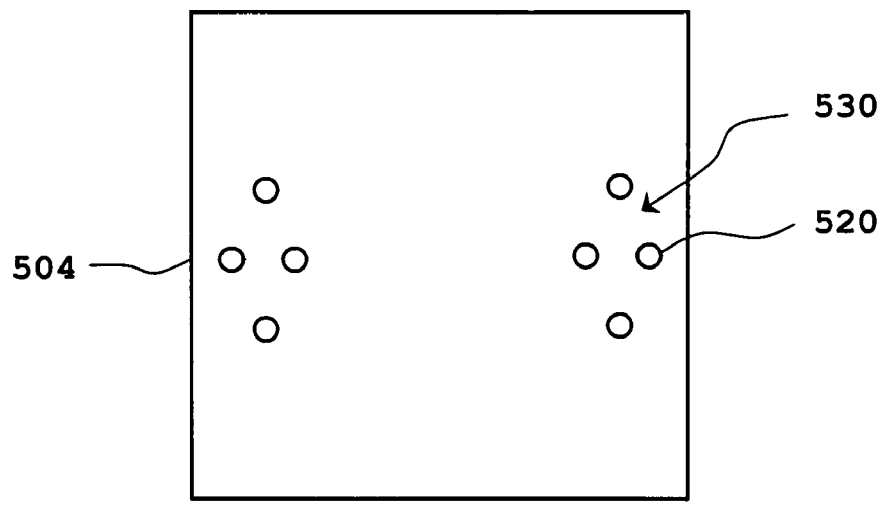
Figure 9D:
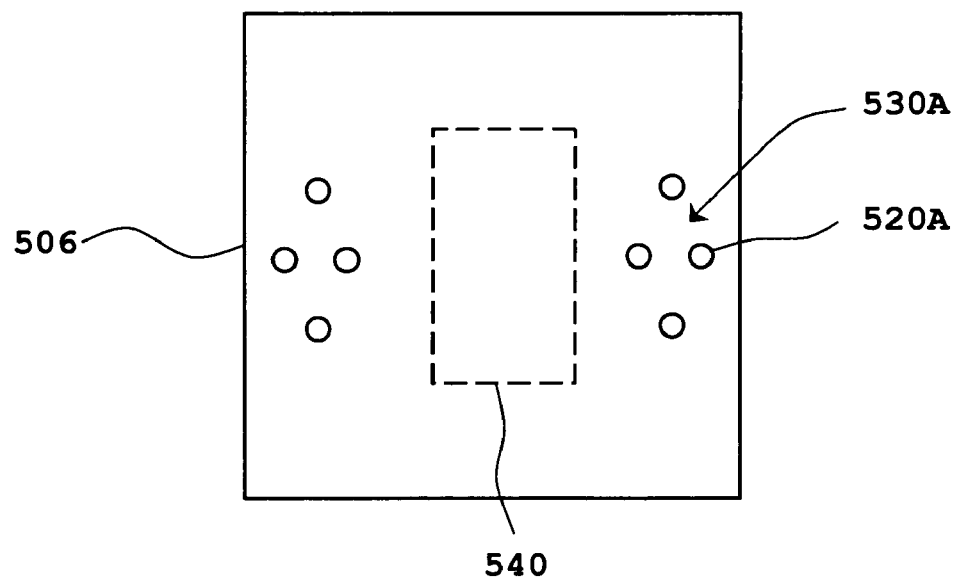
Figure 10A:
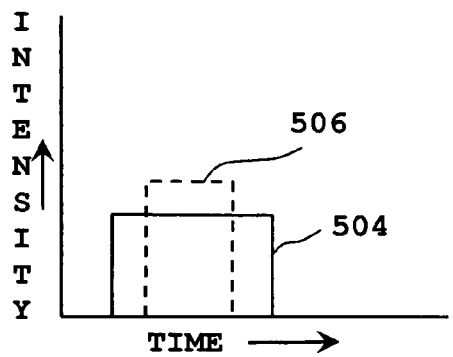
FIG. 10 is a perspective view of the sprinkler head after the grass trimming and edging has been completed.
Figure 10B:
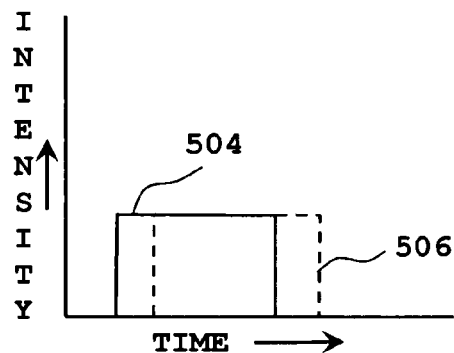
Figure 10C:
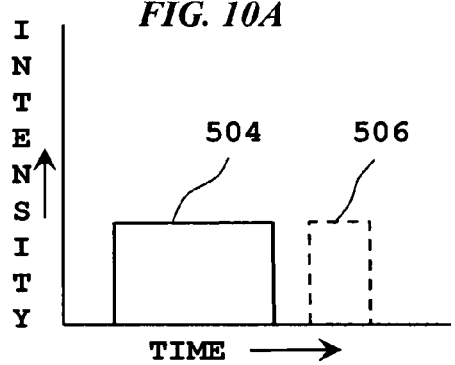
Figure 10D:
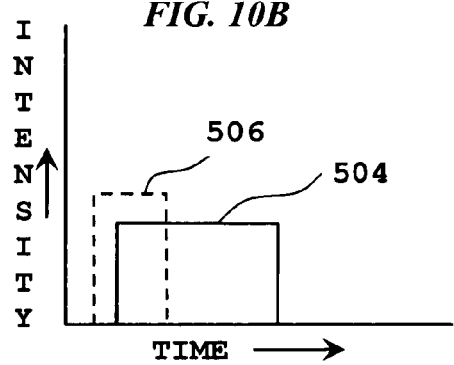
Figure 10E:
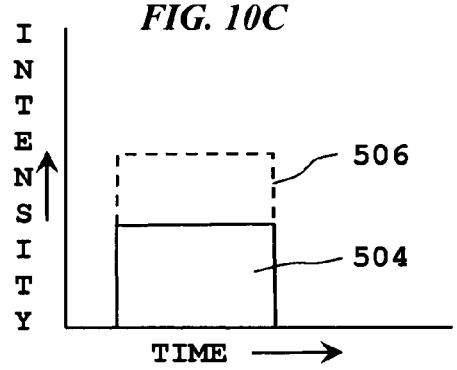
Figure 10F:
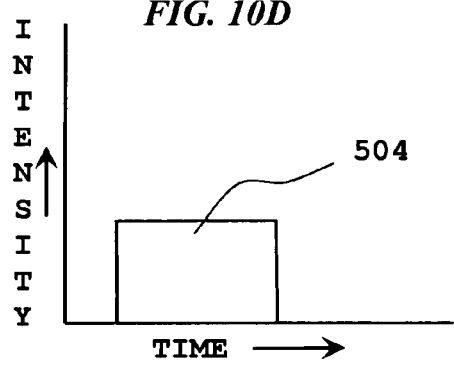
Figure 10G:
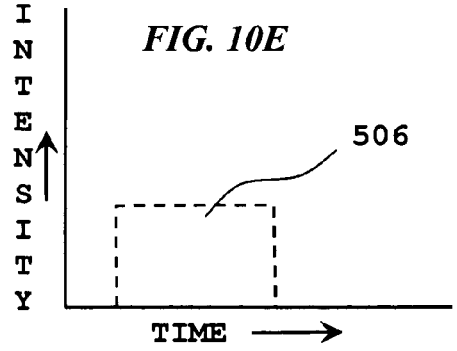
Figure 8:
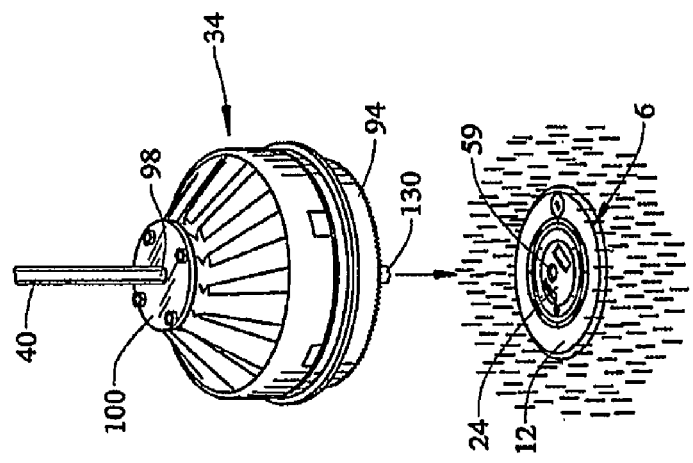
FIG. 8 is a perspective view of the head cover trimming system descending down over the sprinkler head with a centering shaft portion of the grass trimming system entering a centering member of the head cap.

Referring to FIGS. 7–10, the manner in which cutting head system 34 cuts grass around sprinkler head assembly 6 will now be described. Initially, it should be understood that the term "trimming" is used broadly and therefore refers not only to cutting blades of grass but to edging the area about sprinkler head assembly 6 as well. In any event, to initiate a trimming process, cutting head system 34 is positioned over sprinkler head assembly 6 as represented in FIG. 7. Cutting head system 34 is then lowered onto sprinkler head assembly 6 so that centering shaft 130 is received by centering member 58. In this manner, cutting blade 94 is properly positioned or centered about sprinkler head assembly 6 before cutting begins as represented in FIG. 8. After cutting blade 94 is properly centered, a downward force is applied to cutting head assembly 34 causing centering shaft 130 to retract into centering shaft housing 136 against the biasing force of spring 151. Once cutting head system 34 is properly centered and positioned about sprinkler head assembly 6, a driving force is applied to driven end 96 of drive shaft 40 (FIG. 9). In turn, driving end 98 of drive shaft 40 rotates cutting head system 34 about sprinkler head assembly 6, thereby trimming grass, dirt and other foreign objects from around top cover 12 and cylindrical body 13. As cutting head system 34 rotates, vented openings 90 create a vortex-like airflow that expels the cut grass from within head member 76. In addition, it should be noted that the rotation of cutting head system 34 is not imparted to centering shaft 130. That is, the presence of bearings 146 and 147 allows centering shaft 130 to remain stationary with respect to cutting head system 34. With this construction, centering shaft 130 will not wear away or otherwise damage centering member 58 which, over time, would result in centering problems. Upon completion of the trimming operation as illustrated in FIG. 10, cutting head assembly 34 is raised from sprinkler head assembly 6 allowing centering shaft 130 to return to an extended position under the biasing force of spring 151. As described, this overall operation will leave behind a well maintained sprinkler head which, when supplied with water, should operate normally.

Obviously, the above description detailing the operation of head cover trimming system 20 trimming grass about sprinkler head assembly 6 is but one preferred application. It should be apparent that cutting head system 34 is readily adaptable to a wide range of applications. That is, any circular or substantially circular ground level cover can be fitted with a head cap 24 so as to accommodate cutting head system 34. In this manner, drain covers, yardage markers and valve access covers, to list but a few, can be trimmed with the trimming system of the present invention. Moreover, each of the aforementioned objects could actually be formed with a centering member so as to receive the centering shaft of cutting head system 34.

Although described with reference to a preferred embodiment of the present invention, it should be readily apparent to one of ordinary skill in the art that various changes and/or modifications can be made to the invention without departing from the spirit thereof. For instance, while head cap 24 is illustrated as an integral part of the overall trimming system, cap 24 may be also provided separately. That is, head cap 24 may be provided as a retrofit part to adapt existing sprinkler heads for use with the cutting head system of the present invention. For instance, head cap 24 may be secured to sprinkler head assembly 6 with glue, mechanical fasteners, double sided tape or the like. Furthermore, while centering member 58 is described as a recess, other structure, such as cylindrical pins, multiple recesses or protrusions that would cooperate with associated centering structure on the cutting head assembly, would also be acceptable. In general, the invention is only intended to be limited to the scope of the following claims.

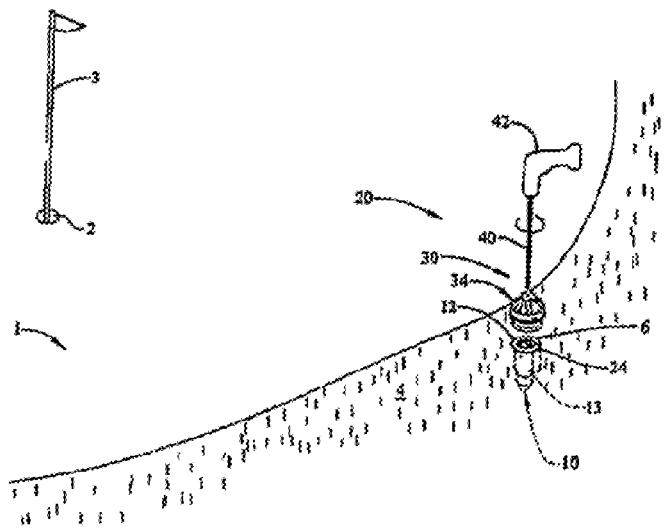

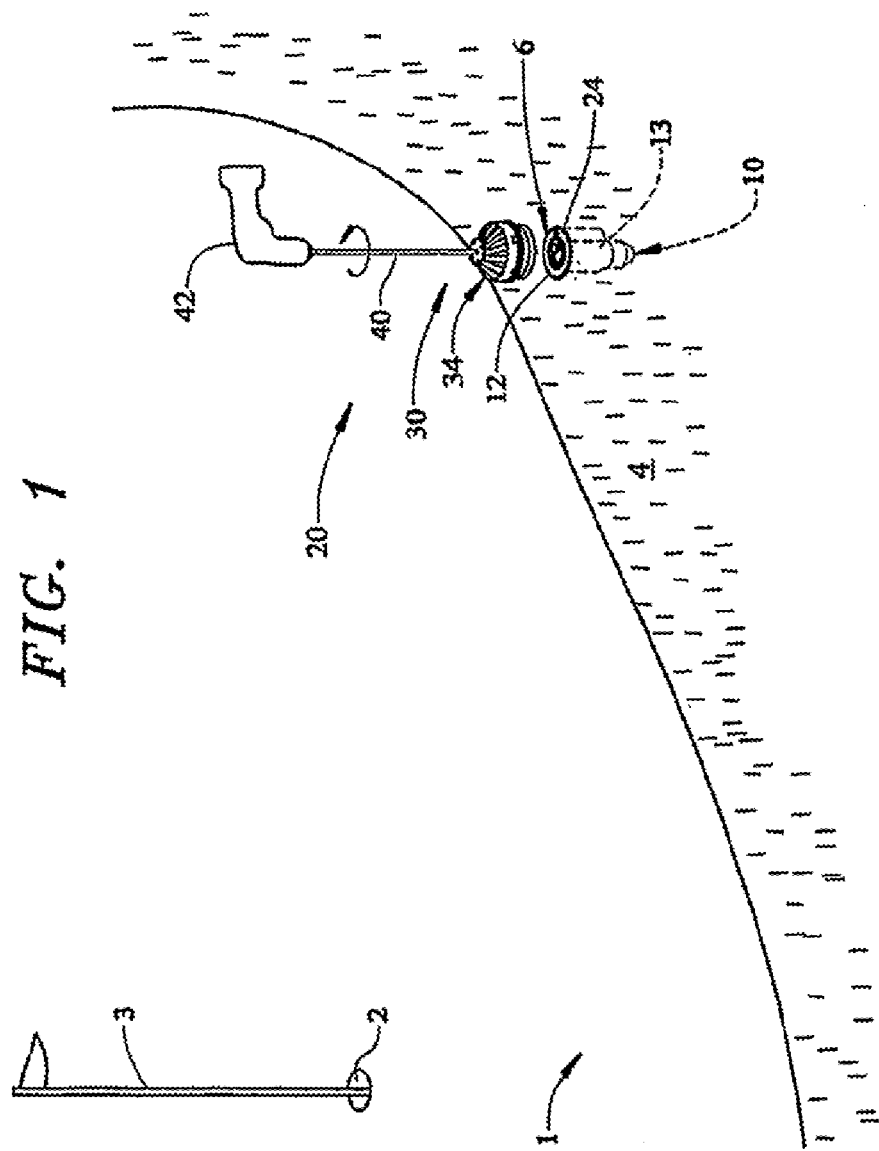

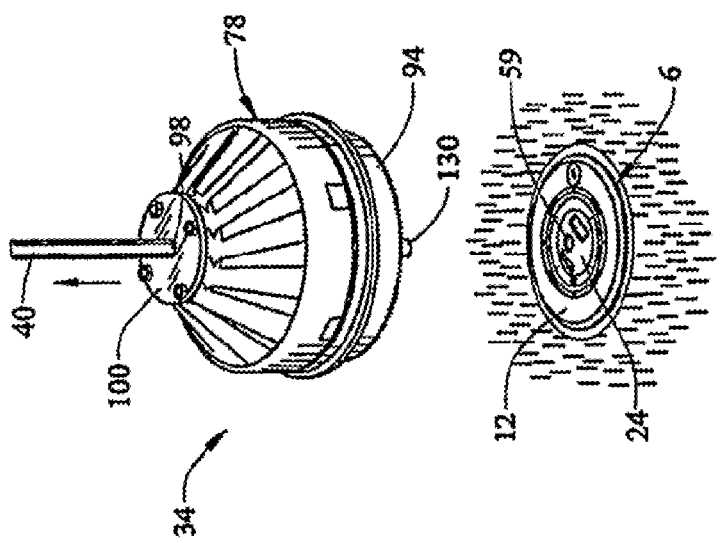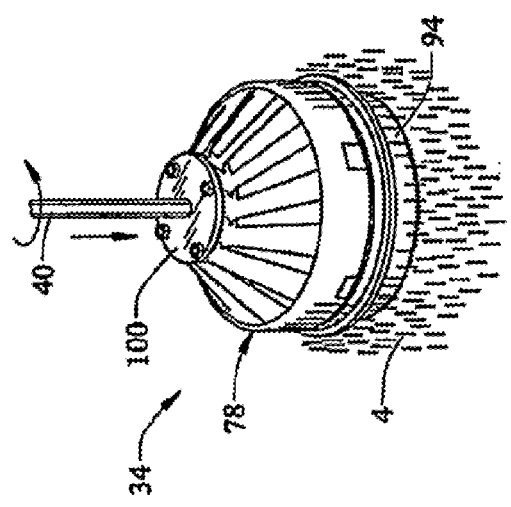

I claim:

1. A head cover trimming system for cutting grass around a substantially ground level sprinkler head comprising:
   a sprinkler head including a housing having a top cover portion and a buried body portion;
   a head cap provided on the sprinkler head, said head cap including a main body portion fixed to the top cover portion of the housing, said main body portion including a top surface provided with a centering member; and
   a cutting head system including:

a head member having a peripheral edge portion interconnected to a central hub through an intermediate web portion, said head member being adapted to extend about the sprinkler head;

a cutting element projecting from the peripheral edge portion of the head member;

a drive shaft member having a driven end portion extending to a driving end portion, said driving end portion being drivingly connected to the head member;

a centering element housing extending into the head member, said centering element housing having a first end secured to the head member, a second end, and a hollow cylindrical main body portion extending therebetween;

a centering element positioned in the centering element housing, extending within the head member and projecting beyond the cutting element, said centering element being adapted to engage with the centering member of the head cap to center the head member about the sprinkler head such that, upon application of a driving force to the driven end portion of the drive shaft, the head member rotates about the sprinkler head causing the cutting element to trim around the sprinkler head;

a spring member extending within the head member, said centering element being retractably mounted within the head member, with the spring member biasing the centering element outward from the head member; and a cutting element holder, said cutting element holder having a first edge portion detachably secured to the head member and a second edge portion defining a cutting blade receiving recess.

2. A cutting head system adapted to be rotated in order to trim around a head cover having a head cap provided with a centering member comprising:

a head member having a peripheral edge portion interconnected to a central hub through an intermediate web portion, said head member being adapted to extend about a head cover;

a cutting element projecting from the peripheral edge portion of the head member;

a drive shaft member having a driven end portion extending to a driving end portion, said driving end portion being drivingly connected to the head member;

a centering element housing extending into the head member, said centering element housing having a first end secured to the head member, a second end, and a hollow cylindrical main body portion extending therebetween; and a centering element positioned in the centering element housing1 extending within the head member and projecting beyond the cutting element, said centering element being adapted to engage with the centering member of the head cap to center the head member about the head cover such that, upon application of a driving force to the driven end portion of the drive shaft, the head member rotates about the head cover causing the cutting element to trim grass growing around the head cover; and a spring member extending within the head member, said centering element being retractably mounted within the head member, with the spring member biasing the centering element outward from the head member.

3. The cutting head system according to claim 2, wherein the centering member is constituted by a recess provided in the head cap.

4. The cutting head system according to claim 2, wherein the head member includes an outer peripheral side portion leading to the intermediate web portion that tapers upwardly and extends to the central hub.

5. The cutting head system according to claim 3, wherein the intermediate web portion includes a plurality of vent openings wherein, upon application of the driving force to the drive shaft, said vent openings create an airflow to expel grass from under the head member.

6. The cutting head system according to claim 2, further comprising:

a bearing element mounted within the centering element housing; and a centering element retainer supported within the centering element housing through the bearing element, said centering element retainer retractably positioning the centering element within the centering element housing with said head member being adapted to rotate relative to the centering element.

7. The cutting head system according to claim 2, wherein the head member is detachably mounted to the driven end portion of the drive shaft.

8. The cutting head system according to claim 2, wherein the cutting element is constituted by a substantially circular cutting blade, said cutting blade being detachably secured to the peripheral edge portion of the head member.

9. A cutting head system adapted to be rotated in order to trim around a head cover having a head cap provided with a centering member comprising:

a head member having a peripheral edge portion interconnected to a central hub through an intermediate web portion, said head member being adapted to extend about a head cover;

a cutting element projecting from the peripheral edge portion of the head member;

a drive shaft member having a driven end portion extending to a driving end portion, said driving end portion being drivingly connected to the head member;

a centering element housing extending into the head member, said centering element housing having a first end secured to the head member, a second end, and a hollow cylindrical main body portion extending therebetween;

a centering element positioned in the centering element housing, extending within the head member and projecting beyond the cutting element, said centering element being adapted to engage with the centering member of the head cap to center the head member about the head cover such that, upon application of a driving force to the driven end portion of the drive shaft, the head member rotates about the head cover causing the cutting element to trim grass growing around the head cover; and a cutting element holder, said cutting element holder having a first edge portion detachably secured to the head member and a second edge portion defining a cutting blade receiving recess.

10. The cutting head system according to claim 9, wherein the cutting element holder includes a plurality of tab members projecting from the first edge portion and the head member includes a corresponding plurality of slots arranged about the outer peripheral edge portion, said plurality of tab members being adapted to engage with corresponding plurality of slots to position the cutting element holder relative to the head member.

11. The cutting head system according to claim 9, wherein the cutting element is constituted by a circular blade having a first edge portion including a plurality of cutting teeth leading to a second edge portion mounted within the cutting blade receiving recess of the cutting element holder.

12. The cutting head system according to claim 2, wherein the head cover constitutes a sprinkler head cover.

13. A cutting head system adapted to be rotated in order to trim around a head cover having a head cap provided with a centering member comprising:
- a head member having a peripheral edge portion interconnected to a central hub through an intermediate web portion, said head member being adapted to extend about a head cover;
- a cutting element projecting from the peripheral edge portion of the head member;
- a cutting element holder, said cutting element holder having a first edge portion detachably secured to the head member and a second edge portion defining a cutting blade receiving recess;
- a drive shaft member having a driven end portion extending to a driving end portion, said driving end portion being drivingly connected to the head member; and
- a centering element extending within the head member and projecting beyond the cutting element, said centering element being adapted to engage with the centering member of the head cap to center the head member about the head cover such that, upon application of a driving force to the driven end portion of the drive shaft, the head member rotates about the head cover causing the cutting element to trim grass growing around the head cover.

14. The cutting head system according to claim 13, wherein the centering member is constituted by a recess provided in the head cap.

* * * * *

UNITED STATES PATENT AND TRADEMARK OFFICE
CERTIFICATE OF CORRECTION

PATENT NO. : 7,140,112 B2
APPLICATION NO. : 10/645574
DATED : November 28, 2006
INVENTOR(S) : McNulty It is certified that error appears in the above-identified patent and that said Letters Patent is hereby corrected as shown below:

Delete Title page illustrating figure, and substitute therefor, new Title page illustrating figure. (attached)

Delete drawing figures 1-7, and substitute drawing figures 1-7, as shown on the attached sheets.

Signed and Sealed this

Thirteenth Day of February, 2007

JON W. DUDAS
*Director of the United States Patent and Trademark Office*

United States Patent
McNulty

(10) Patent No.: US 7,140,112 B2
(45) Date of Patent: Nov. 28, 2006

(54) HEAD COVER TRIMMING SYSTEM

(75) Inventor: Edward McNulty, Midland, VA (US)

(73) Assignee: JEG, Inc., Midland, VA (US)

(*) Notice: Subject to any disclaimer, the term of this patent is extended or adjusted under 35 U.S.C. 154(b) by 257 days.

(21) Appl. No.: 10/645,574

(22) Filed: Aug. 22, 2003

(65) Prior Publication Data
    US 2005/0039583 A1    Feb. 24, 2005

(51) Int. Cl.
    B26B 25/00    (2006.01)

(52) U.S. Cl. .............. 30/316; 30/276; 30/286; 30/DIG. 7; 172/13; 172/15

(58) Field of Classification Search ........ 30/276, 30/300, 301, 316, 347, DIG. 7, 286, 287, 30/294; 172/13, 15, 25, 19, 111
See application file for complete search history.

(56) References Cited

U.S. PATENT DOCUMENTS

| | | | |
|---|---|---|---|
| 1,064,790 A * | 6/1913 | Tucker | 30/316 |
| 1,857,383 A * | 5/1932 | Johnson | 30/316 |
| 2,882,600 A * | 4/1959 | Baker | 30/316 |
| 3,062,299 A * | 11/1962 | Koepfinger | 172/18 |
| 3,143,176 A * | 8/1964 | Drane, Jr. | 172/13 |
| 3,174,224 A * | 3/1965 | Rousselet | 30/264 |
| 3,554,293 A * | 1/1971 | Aman et al. | 172/13 |
| 3,555,680 A * | 1/1971 | Ford | 30/236 |
| 3,565,179 A * | 2/1971 | Paliani | 172/19 |
| 3,747,213 A * | 7/1973 | Green et al. | 30/279.2 |
| 3,814,189 A * | 6/1974 | Thompson | 172/13 |
| 3,905,103 A * | 9/1975 | Ford et al. | 30/276 |
| 3,960,218 A | 6/1976 | Atchley et al. | |
| D242,894 S | 1/1977 | Harris | |
| 4,260,025 A | 4/1981 | Deckert | |
| 4,357,752 A | 11/1982 | Goodwin, Jr. | |
| 4,547,966 A | 10/1985 | Rias | |
| 4,832,131 A * | 5/1989 | Powell et al. | 172/25 |
| 5,461,788 A * | 10/1995 | Taylor | 30/300 |
| 5,938,290 A | 8/1999 | Mikeska | |
| 6,038,774 A | 3/2000 | Boekeloo et al. | |
| 6,125,776 A * | 10/2000 | Carmichael | 111/113 |
| 6,134,789 A * | 10/2000 | Strickland | 30/276 |
| 6,247,539 B1 * | 6/2001 | Jerez | 172/41 |
| 6,311,782 B1 | 11/2001 | Piasek et al. | |
| 6,413,568 B1 | 7/2002 | Thede | |

OTHER PUBLICATIONS

Reliable Golf Course Supplies, 2002 Catalog, TAS Trimmers, pp. 13.

(Continued)

Primary Examiner—Boyer D. Ashley
Assistant Examiner—Carolyn Blinke
(74) Attorney, Agent, or Firm—Diederiks & Whitelaw PLC

(57) ABSTRACT

A head cover trimming system for trimming around a ground level head cover includes a head cap and a grass trimmer assembly. The head cap is provided on the head cover and includes a centering member. The grass trimmer assembly includes a head member having a peripheral edge portion along which is mounted a cutting element. The grass trimmer assembly is driven through a drive shaft connected to a rotary tool at one end. Arranged within the head member is a retractable centering shaft. When the head member is placed over the head cover, the centering shaft is received by the centering member to center the grass trimmer about the head cover. The centering shaft retracts into the head member to allow the rotating cutting element to trim the area around the head cover.

14 Claims, 7 Drawing Sheets